United States Patent [19]
Quinn et al.

[11] Patent Number: 6,074,462
[45] Date of Patent: Jun. 13, 2000

[54] AIR DRYER RESERVOIR MODULE COMPONENTS

[75] Inventors: Leonard A. Quinn, Elyria; Fred W. Hoffman, Columbia Station, both of Ohio; David J. Goodell, Beaverton, Oreg.

[73] Assignee: AlliedSignal Truck Brake Systems Co., Elyria, Ohio

[21] Appl. No.: 09/030,583

[22] Filed: Feb. 25, 1998

Related U.S. Application Data

[63] Continuation-in-part of application No. 08/993,931, Dec. 18, 1997, Pat. No. 5,917,139.

[51] Int. Cl.[7] ............................. B01D 53/04; B01D 53/26
[52] U.S. Cl. ................................ 96/113; 96/136; 96/144; 96/147; 55/DIG. 17
[58] Field of Search ............................. 55/DIG. 17, 108, 55/109, 113–116, 130–136, 143, 144, 147

[56] References Cited

U.S. PATENT DOCUMENTS

| | | | |
|---|---|---|---|
| 3,080,693 | 3/1963 | Glass et al. | 96/113 |
| 3,242,650 | 3/1966 | Crawaford | 96/113 |
| 3,399,510 | 9/1968 | Kauer, Jr. et al. | 96/113 X |
| 3,464,186 | 9/1969 | Hankison et al. | 96/115 |
| 3,592,563 | 7/1971 | Glass et al. | 96/136 X |
| 3,714,763 | 2/1973 | Suzuki | 96/113 |
| 3,937,622 | 2/1976 | Hewitt et al. | 96/113 |
| 4,272,265 | 6/1981 | Snyder | 96/115 |
| 4,373,938 | 2/1983 | McCombs | 96/114 |
| 4,655,801 | 4/1987 | Kojima et al. | 55/218 |
| 4,714,483 | 12/1987 | Koening et al. | 96/113 |
| 4,764,189 | 8/1988 | Yanagawa et al. | 96/112 X |
| 4,892,569 | 1/1990 | Kojima | 96/113 |
| 5,209,764 | 5/1993 | Eberling | 96/114 |
| 5,286,283 | 2/1994 | Goodell | 96/113 |
| 5,458,676 | 10/1995 | Herbst et al. | 96/109 |
| 5,458,677 | 10/1995 | VanderMolen | 96/113 |
| 5,522,150 | 6/1996 | Schultz | 96/113 X |
| 5,575,541 | 11/1996 | Elamin | 96/113 X |
| 5,607,500 | 3/1997 | Shamine et al. | 96/147 X |

FOREIGN PATENT DOCUMENTS

| | | | |
|---|---|---|---|
| 60-022555 | 2/1985 | Japan | 96/109 |
| 60-064616 | 4/1985 | Japan | 96/113 |
| 62-149320 | 7/1987 | Japan | 96/108 |

*Primary Examiner*—Robert H. Spitzer

[57] ABSTRACT

An air dryer and reservoir assembly for providing compressed air from an air compressor (20) on a heavy motor vehicle which includes an air dryer (14) connected to receive compressed air from the air compressor (20) and a secondary reservoir (12), including an integral purge volume (34), for storing compressed air which passes through the air dryer (14), with the air dryer (14) and the secondary reservoir (12) being securely attached to a housing (16) to form an air dryer reservoir module (10). A primary reservoir (18) for storing compressed air from the air dryer (14) is located remote from the air dryer reservoir module (10). A pressure equalizing mechanism (57) is disposed between the primary reservoir (18) and the secondary reservoir (12) for keeping pressure in the two reservoirs (12,18) equal. Components located within the housing (16) control air flow between the air dryer (14) and the primary and secondary reservoirs (18,12) and also monitor the pneumatic brake system circuits fed by the primary and secondary reservoirs (18,12).

9 Claims, 6 Drawing Sheets

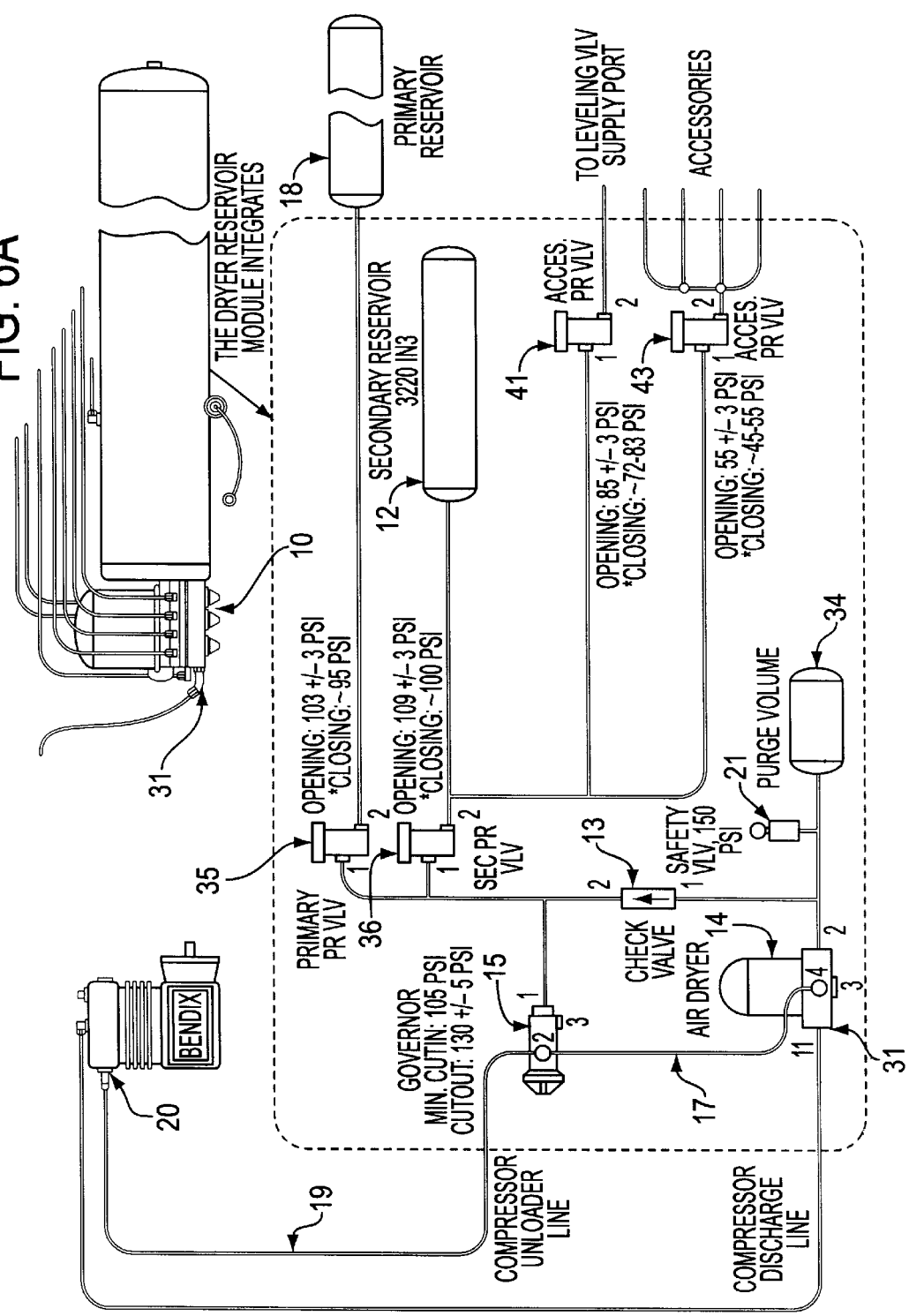

AIR DRYER RESERVOIR MODULE COMPONENTS

CROSS-REFERENCE TO RELATED APPLICATIONS

This application is a continuation-in-part of U.S. Patent application Ser. No. 08/993,931, filed on Dec. 18, 1997 and now U.S. Pat. No. 5,917,139.

BACKGROUND OF THE INVENTION

1. Field of the Invention

This invention relates to air dryers and more particularly to an air dryer and a reservoir, including a separate purge volume, constructed together as a module.

2. Description of Prior Art

Air dryers have been used to dry the air in a heavy vehicle air brake system for many years. The advantages of clean arid dry air in air brake systems has long been recognized, as moisture entrained in the air brake system may during cold weather operation cause the components of the air brake system to freeze, thus rendering the system inoperable. These prior art air dryers normally include a desiccant material through which the compressed air flows. When the vehicle air compressor has charged the vehicle air reservoirs to a sufficient pressure level, the compressor is unloaded so that the compressor no longer compresses air. When the compressor is unloaded, a signal is transmitted to a purge valve carried within the air dryer which causes stored compressed air to backflow through the desiccant at a controlled rate to regenerate the desiccant. The air used to regenerate the desiccant can be either from compressed air stored in an integral purge volume within the air dryer or from compressed air stored in a separate reservoir.

Most prior art compressed air systems for heavy vehicle air brake applications use three reservoirs which are separate from the air dryer. A compressor feeds compressed air to the air dryer which after flowing through the desiccant bed is fed to a remote supply reservoir. The supply reservoir is connected to feed compressed air to a primary reservoir and a secondary reservoir. The primary and secondary reservoirs feed pneumatic circuits which can control the air brake system of the vehicle. For protection from loss of air pressure the primary and secondary reservoirs each include a check valve in their pneumatic connections to the supply reservoir. A pneumatic control line extends from the supply reservoir to an air pressure governor which controls loading and unloading of the air compressor.

SUMMARY OF THE INVENTION

The present invention is for an air dryer and reservoir assembly, for providing compressed air from an air compressor for operating the brakes of a heavy motor vehicle, which includes an air dryer connected to receive compressed air from the air compressor, a secondary air reservoir separate from the air dryer, a housing containing pneumatic circuit components for controlling the flow of compressed air from the air compressor through the air dryer to the secondary reservoir having the air dryer securely attached to one section thereof and the secondary reservoir securely attached to another section thereof for securing the air dryer and the secondary reservoir together as a unitary air dryer reservoir module. The compressed air brake system with the air dryer reservoir module also includes a primary air reservoir having a pneumatic connection to the housing disposed remote from the secondary air reservoir with the housing containing pneumatic circuit components for controlling compressed air flow between the air dryer and the primary air reservoir. Pneumatic circuit protection valves are disposed within the housing for monitoring the pneumatic circuits fed by the primary and secondary reservoirs. A failure detection means is also disposed within the housing for detecting a failure of the pneumatic circuits which are fed by the primary and secondary reservoirs and in the event of a failure of these pneumatic circuits the speed of the heavy vehicle is limited. The herein disclosed air brake system's air charging and treatment sub-system referred to as the air dryer reservoir module provides for a simplified and cost effective air charging sub-system, using integrated components. The air dryer reservoir module is configured in a way that allows the elimination of the supply reservoir, which is used in the standard three reservoir system, while providing a means of simultaneously sensing both the primary reservoir and the secondary reservoir for air compressor and air dryer control.

The air dryer reservoir module integrates components such as pressure protection valves, the air compressor governor, pressure relief valves, pressure sensors and the like in a way that eliminates the need for the supply reservoir, the supply reservoir safety valve, several of the standard three reservoir system's external lines and many of its fittings. The reduction of components, fittings and pneumatic lines reduces potential failure modes. With respect to a standard three reservoir system, the air dryer reservoir module integrates the following components: air dryer, primary and secondary check valves, supply and secondary drain valves, supply reservoir safety valve, the compressor governor, auxiliary system pressure protection valves, and the supply and secondary reservoirs.

A purge volume can be built into the end of the secondary reservoir to which the air dryer is attached. An internal baffle separates the secondary reservoir volume from the purge volume. Internal communication passages connect the secondary reservoir and purge volume to the air dryer. The dryer reservoir module can also be constructed to equalize the pressure between the primary reservoir and the secondary reservoir, such that if the vehicle is parked for a given period of time the pressure cannot be replenished. Thereby limiting the use of the vehicle with a severely leaking reservoir.

BRIEF DESCRIPTION OF DRAWINGS

For a better understanding of the invention reference may be had to the preferred embodiments exemplary of the inventions shown in the accompanying drawings in which:

FIG. 2A is an illustration of an inboard view of a portion of the compressed air charging system using an air dryer reservoir module shown in FIG. 2;

FIG. 6 is a schematic illustration showing the components included in one embodiment of the air dryer reservoir module; and FIG. 6A is a view of an air dryer reservoir module that integrates the components shown in FIG. 6.

DETAILED DESCRIPTION OF THE PREFERRED EMBODIMENTS

Figure 2:
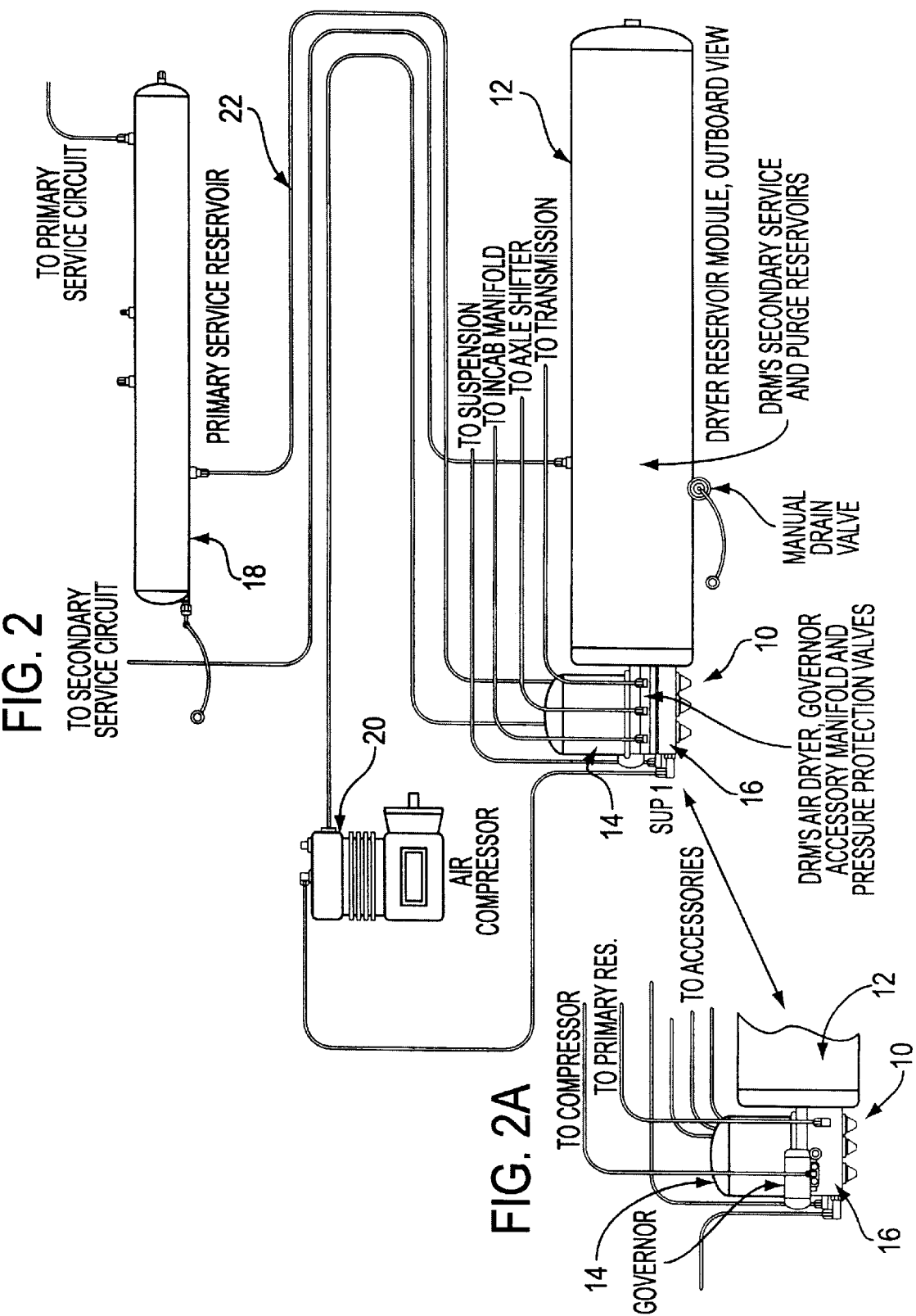
FIG. 2 is an illustration of a compressed air charging system using an air dryer reservoir module according to the present invention.
Figure 3:
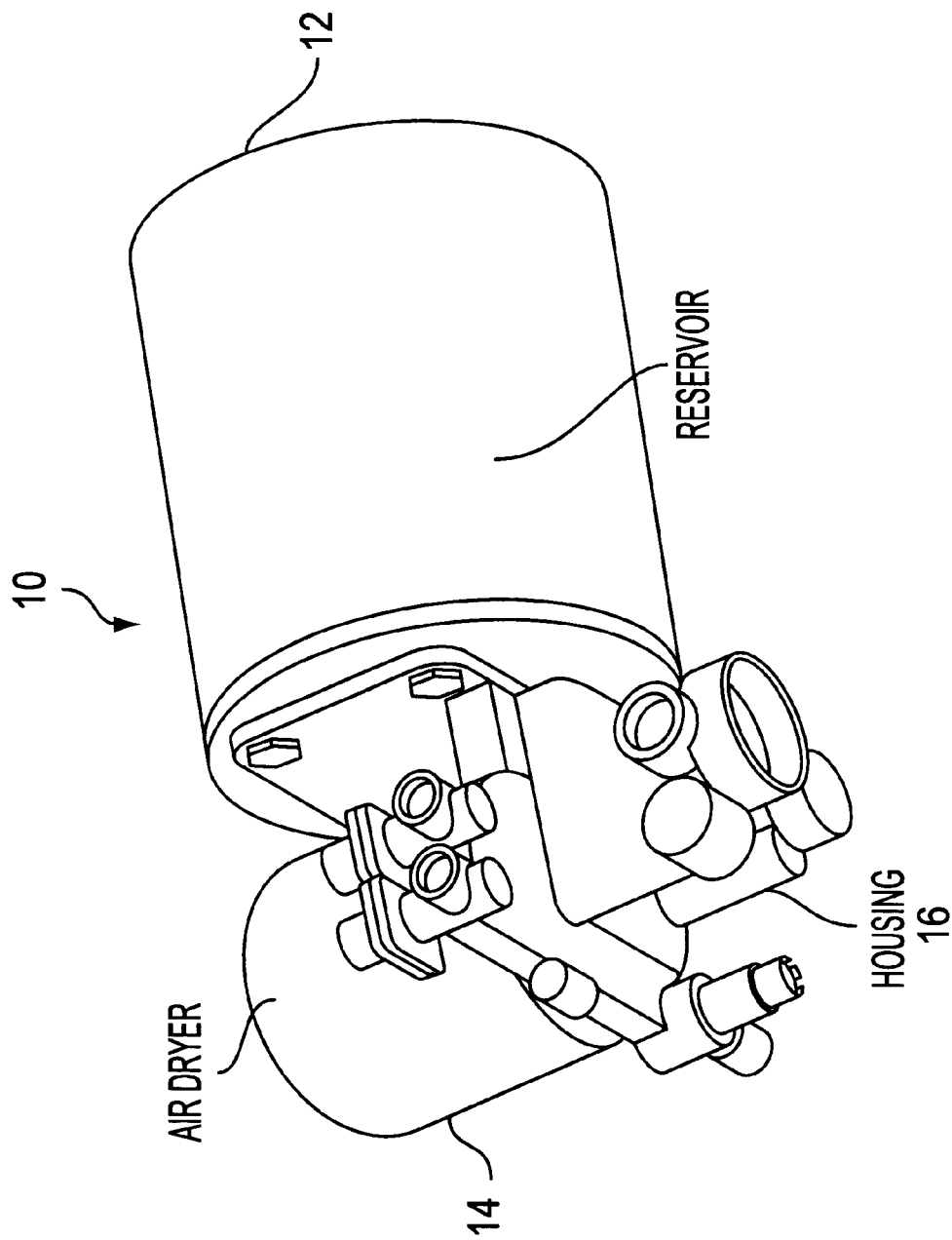
FIG. 3 is a perspective view of an air dryer reservoir module according to the present invention.

Referring now to the drawings and FIGS. 2 and 3 in particular there is shown an air dryer reservoir module and 10 according to the present invention. The air dryer module 10 provides compressed air received from an air compressor 20 for operating the brakes of a heavy motor vehicle. The air dryer module 10 includes an air dryer 14 connected to receive compressed air from the air compressor 20, a secondary air reservoir 12 separate from the air dryer 14, and a housing 16 containing pneumatic circuit components for controlling the flow of compressed air from the air compressor 20 through the air dryer 14 to the secondary reservoir 12 and a primary reservoir 18. The housing 16 has the air dryer 14 securely attached to one section thereof and the secondary reservoir 12 securely attached to another section thereof for joining the air dryer 14 and the secondary reservoir 12 together forming the unitary air dryer reservoir module 10. The compressed air brake system with the air dryer reservoir module 10 also includes the primary air reservoir 18 having a pneumatic connection 22 to the housing 16 disposed remote from the secondary air reservoir 12. The housing 16 also containing pneumatic circuit components for controlling compressed air flow between the air dryer 14 and the primary air reservoir 18. Pneumatic circuit protection valves are disposed within the housing 16 for monitoring the pneumatic circuits fed by the primary reservoir 18 and the secondary reservoir 12. A failure detection means is also disposed within the housing 16 for detecting a failure of the pneumatic circuits which are fed by the primary and secondary reservoirs 18,12 and in the event of a failure of these pneumatic circuits the speed of the heavy vehicle is limited.

Figure 1:
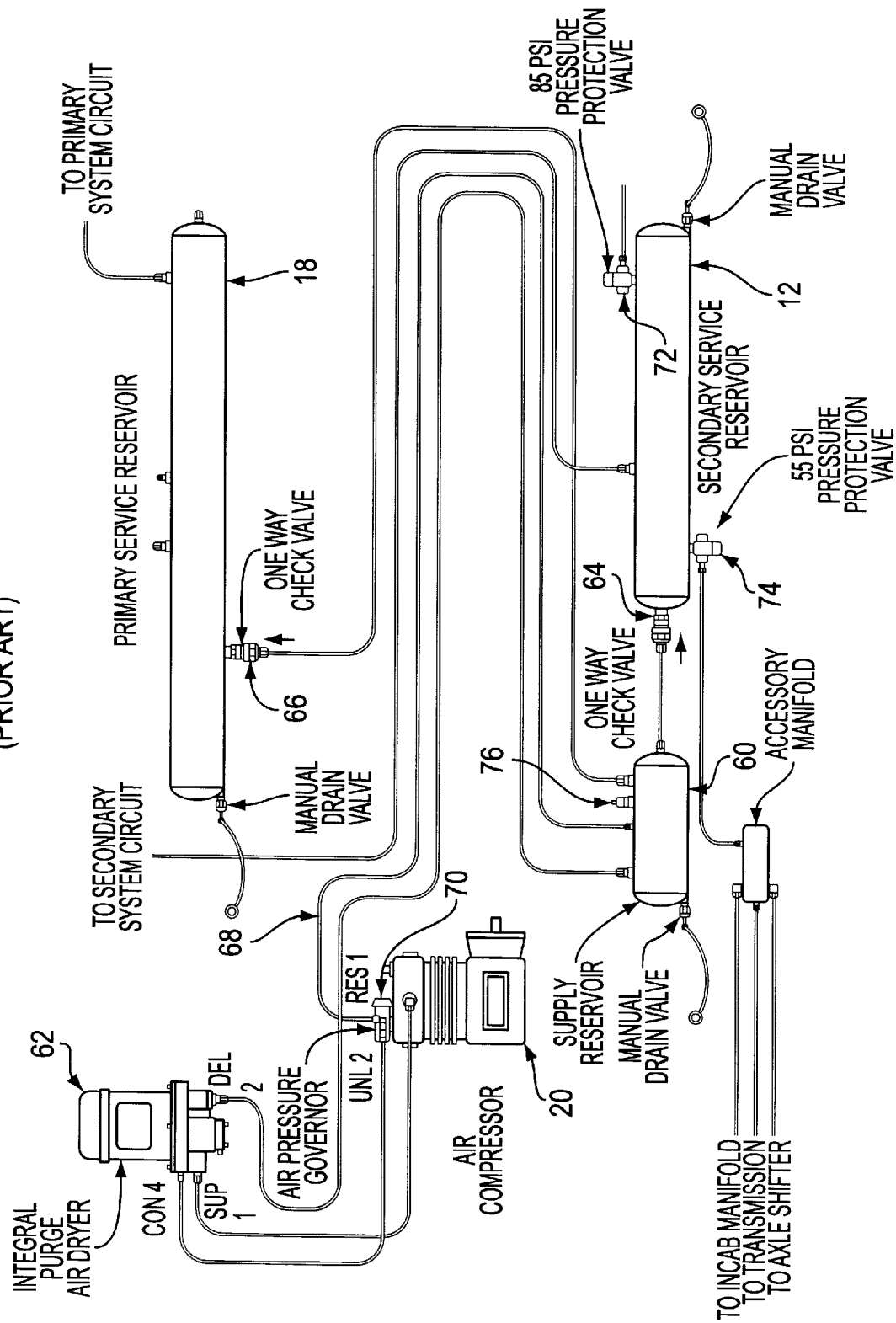
FIG. 1 is an illustration of a prior art three reservoir compressed air charging system.

Referring to FIG. 1 there is shown a relatively standard prior art three reservoir pneumatic charging system for the brake system of a heavy motor vehicle. Most prior art compressed air systems for heavy vehicle air brake applications use a primary reservoir 18, a secondary reservoir 12 and a supply reservoir 60 which are separate from the air dryer. A compressor 20 feeds compressed air to an air dryer 62 which after flowing through the desiccant bed is fed to the remote supply reservoir 60. The supply reservoir 60 is connected to feed compressed air to the primary reservoir 18 and the secondary reservoir 12. The primary reservoir 18 and the secondary reservoir 12 feed pneumatic circuits which can control the air brake system of the vehicle. For protection from loss of air pressure the primary and secondary reservoirs each include a check valve, 66 and 64 respectively, in their pneumatic connections to the supply reservoir 60. A pneumatic control line 68 extends from the supply reservoir 60 to an air pressure governor 70, mounted on the air compressor 20, which controls loading and unloading of the air compressor 20. The secondary reservoir 12 also has attached thereto an 85 psi pressure protection valve 72 and a 55 psi pressure protection valve 74 which feed accessories on the heavy vehicle. The supply reservoir 60 includes a safety valve 76 which is set for 150 psi. All three of the reservoirs 12, 18 and 60 include a manual drain valve which can be used for draining liquid from their respective reservoir.

Comparing FIGS. 1 and 2 illustrates the difference between the air dryer reservoir module 10 and the standard three reservoir system. The air dryer reservoir module 10 integrates components, eliminates pneumatic lines and connections as compared to a standard three reservoir system as shown in FIG. 1. The air dryer reservoir module 10 which is one of the air brake system's charging sub-systems is intended for use on heavy vehicles, such as tractors and trucks, and is configured as shown in the FIGS. 2 and 3. Manufacturing of the air dryer reservoir module 10 system is intended to be by conventional methods. The air dryer reservoir module is different from prior art in that it integrates charging system components in a way that eliminates components, pneumatic lines and pneumatic connections thereby reducing failure modes. The air dryer reservoir module 10 is thought to be the first of its kind to utilize the ABS/EBS brake system ECU to communicate system failures to the engine ECU to instruct the engine to limit vehicle speed. The air dryer reservoir module 10 concept eliminates the supply tank 60 thereby allowing the primary and secondary service tanks 12 and 18 to communicate directly with the integrated air dryer 14 through protection valves 35 and 36. This allows the protection valves 35, 36 to be integrated into the air dryer module 10, reducing external components and pneumatic lines.

Figure 4:
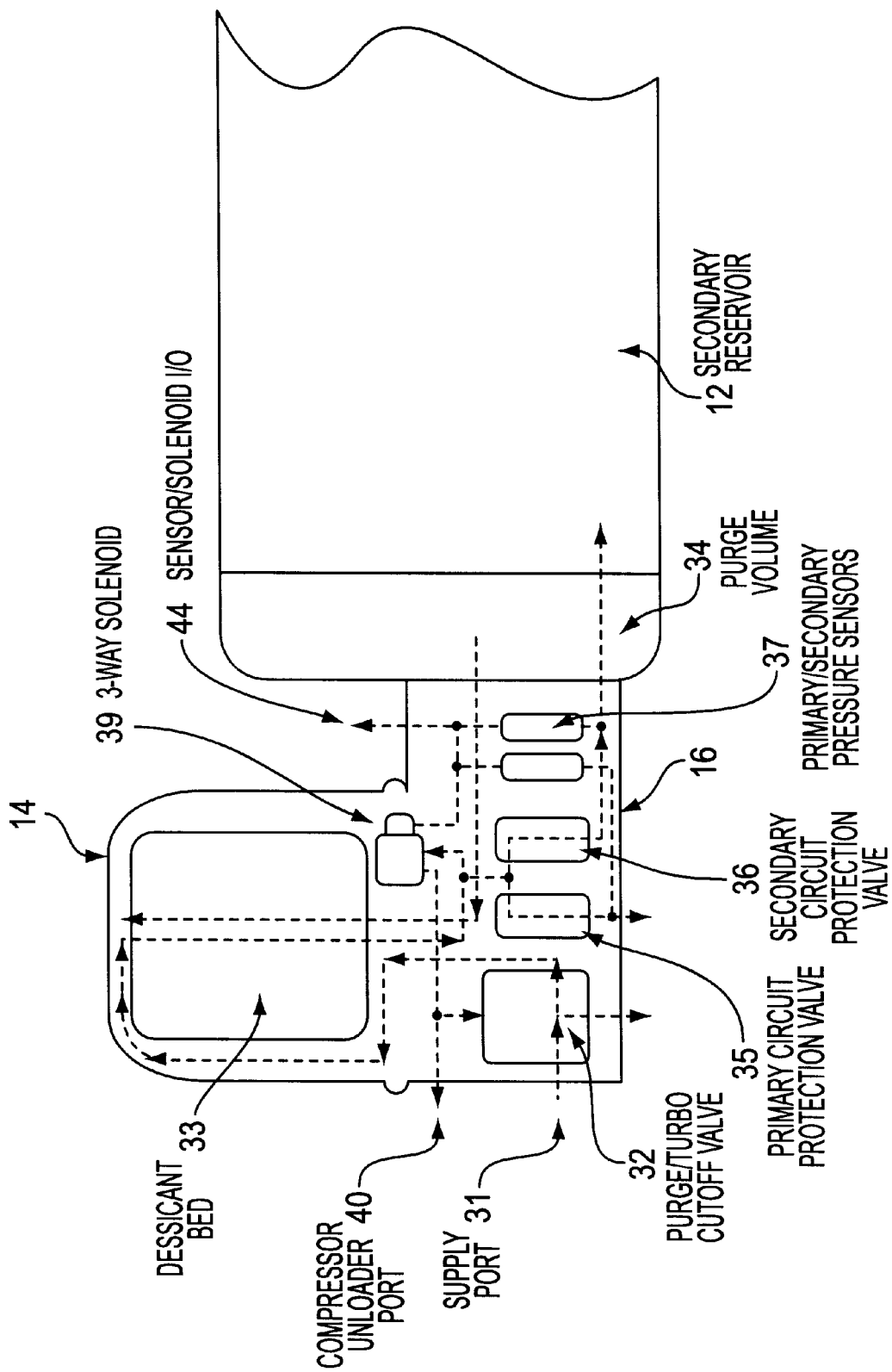
FIG. 4 is an illustration of an air dryer reservoir module according to the present invention showing some of its internal pneumatic flow paths and control components.
Figure 5:
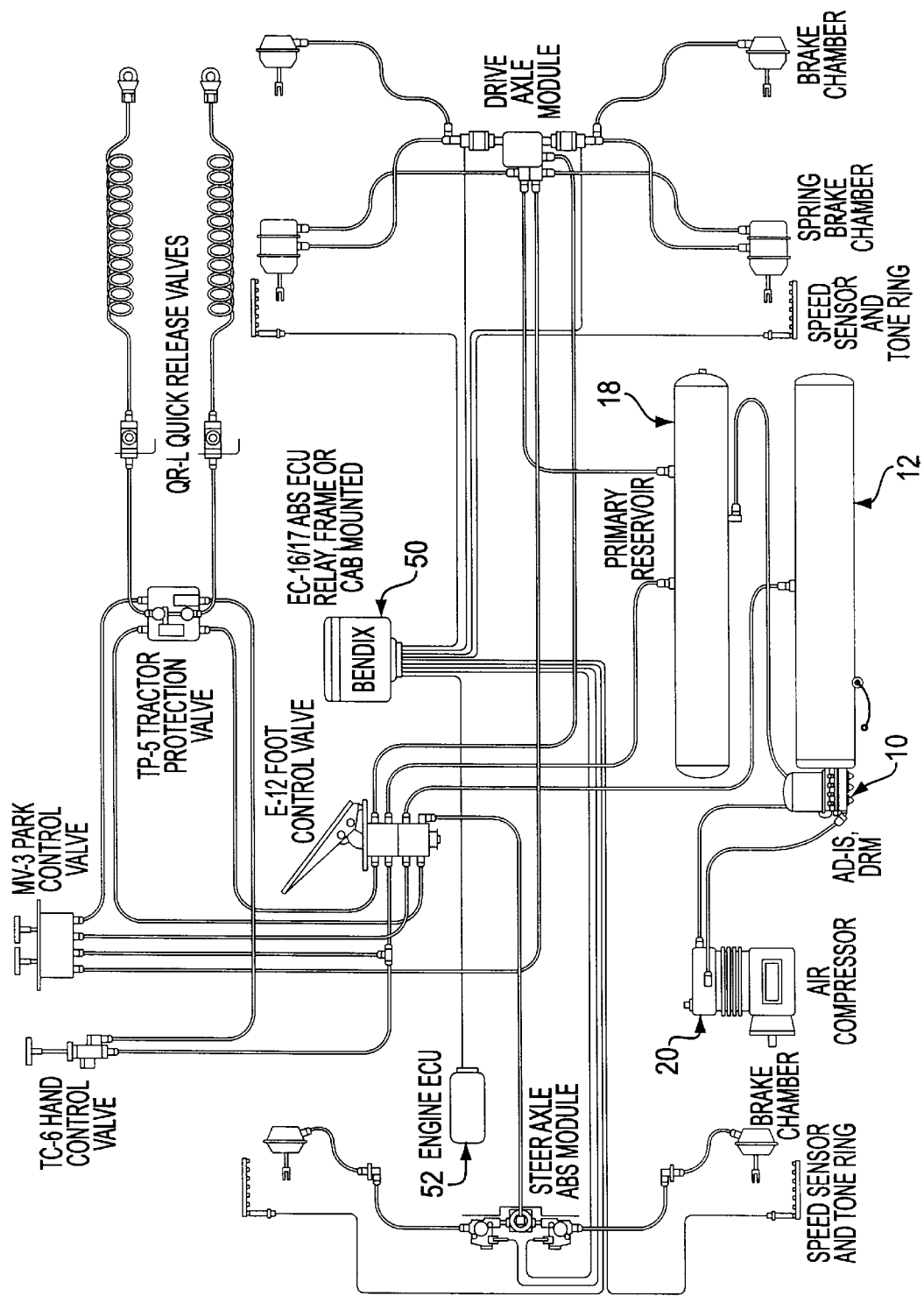
FIG. 5 is an illustration of an air dryer reservoir module according to the present invention used in a service brake system for a heavy motor vehicle.

Referring now to FIGS. 4 and 5, the air dryer reservoir module 10 operates as follows. Charge air from the air compressor 20 enters the air dryer reservoir module 10 at its supply port 31, flows through a purge valve 32 to the desiccant bed 33, fills the purge volume 34, flows through a purge orifice (not shown) and flows out a single check valve (not shown). This represents the same charge cycle as used in an AlliedSignal AD-9 or AD-IP air dryer. From the delivery of the single check valve the charge air flows to the supply of the primary protection valve 35 and secondary protection valve 36. Charge air pressure builds until the protection valves 35, 36 open, allowing air to flow to the primary reservoir 18 and the secondary reservoir 12. Charge air pressure continues to build until the pressure sensors 37 or a mechanical governor (not shown) reach cutout pressure. At cutout pressure the three way solenoid 39 or the mechanical governor opens, unloading the compressor 20 and opening the purge valve 32 purging the air dryer 14. The purge cycle is the same as that of the AlliedSignal AD-9 or AD-IP air dryer. The air dryer reservoir module's 10 integrated component configuration makes it compatible with both integral purge and system purge type air dryer operation and both mechanical and electrical type governors. This allows a single dual function electric solenoid to control the air compressor 20 sending a control signal through compressor unloader port 40, unloading function and to purge the air dryer 14 using both the primary and secondary service reservoirs 18 and 12 respectively. This configuration also allows both reservoirs 12, 18 to purge simultaneously thereby reducing the total system pressure drop required to regenerate the desiccant bed 33 with systems purge type air dryer operation. Use of pressure protection valves 35 and 36 instead of single check valves 66 and 64 reduces compressor 20 cycling. Without the use of check valves 64 and 66 primary reservoir 18 and secondary reservoir 12 are common at pressures above the protection valves 35, 36 opening pressure. Therefore pressure differentials do not develop between primary reservoir 18 and secondary reservoir 12 as air is consumed. Pressure differentials can develop in standard three reservoir systems due to improperly sized reservoirs and use of accessory systems, causing the compressor to cutin before the air pressures in both reservoir 12, 18 have dropped to the cutin pressure.

The air dryer reservoir module 10 can be designed to utilize service reservoir air to purge the desiccant, i.e., supply purge. The operation of the air dryer reservoir module 10 in a supply purge mode will be similar to that of an AlliedSignal AD-SP air dryer. The integral pressure protection valves 35,36 will eliminate the need for externally plumbed protection valves. The internal protection valves 35 and 36, when open will allow air to flow back to a special two position three way system purge solenoid, located where the three way solenoid 39 is in the integral purge design. The special two position three way system purge solenoid will be controlled by the EBS ECU with inputs from the pressure sensors 37 through sensors/solenoid I/O 44. The system purge solenoid will be designed to communicate a control signal to the compressor 20 unloader (through compressor unloader port 40) and the air dryer purge valve 32 independently. At cutout pressure the system purge solenoid will unload the compressor and open the purge valve 32. The system purge solenoid will then close only the purge valve 32 after a predetermined amount of system air is used to purge the dryer's desiccant bed 33. At cutin pressure the system purge solenoid will then load the compressor 20 starting the cycle over.

Referring now to FIG. 6, the embodiment of the illustrated air dryer reservoir module 10 operates as follows. Charge air from the air compressor 20 enters the air dryer reservoir module 10 at its supply port 31, fills the purge volume 34, and flows out a single check valve 13. Check valve isolates the primary reservoir 18 and the secondary reservoir 12 from the output of air dryer 14. An over pressure safety valve 21 which is set for 150 psi is disposed at the outlet from air dryer 14. From the delivery of the single check valve 13 the charge air flows to the supply of the primary protection valve 35 and secondary protection valve 36. Charge air pressure builds until the protection valves 35, 36 open, allowing air to flow to the primary reservoir 18 and the secondary reservoir 12. Charge air pressure continues to build at the outlet of check valve 13 until a mechanical governor 15, which is connected to the outlet of check valve 13, reach cutout pressure. At cutout pressure, which is set at 130 ±5 psi, the mechanical governor 15 opens, providing a pressure drop signal through line 19, unloading the compressor 20 and providing a pneumatic signal along line 17 for initiating purging of the air dryer 14 with the compressed air contained in purge volume 34. Compressor 20 remains unloaded until the pressure to governor 15 falls below the cutin pressure, which is set at 105 psi. At the cutin pressure the governor 15 closes and the compressor is loaded to again supply compressed air to the inlet 31 of air dryer 14.

The primary protection valve 35 is set to open at 103 ±3 psi and to close at approximately 95 psi. The secondary protection valve 36 is set to open at 109 ±3 psi and to close at approximately 100 psi. When both protection valves 35 and 36 are open the primary reservoir 18 and the secondary reservoir 12 are in free fluid communication. Secondary reservoir 12 provides compressed air to a vehicle leveling supply port through an accessory protection valve 41 which is set to open at 85 ±3 psi and to close at approximately 72 to 83 psi. Secondary reservoir 12 also provides compressed air to vehicle accessories through an accessory protection valve 43 which is set to open at 55 ±3 psi and to close at approximately 45 to 55 psi.

The air dryer reservoir module 10 is designed to accommodate the requirements of both FMVSS 121 and EEC regulation No. 13. The air dryer reservoir module 10 is also designed to interact with the ABS/EBS system's J1939/J1922 engine serial link to allow the limiting of vehicle speed in the event of a single circuit brake system failure, either primary or secondary. The air dryer reservoir module 10 reduces the number of OEM installed charging subsystem components, pneumatic lines and connections as follows: Major charging system components—four for air dryer reservoir module 10 vs. thirteen for a three reservoir system; pneumatic lines—three for air dryer reservoir module 10 vs. six for a three reservoir system; and pneumatic connections—thirteen for air dryer reservoir module 10 vs. thirty two for a three reservoir system.

FIG. 5 shows the air dryer reservoir module, in a complete service brake system. The air dryer reservoir module 10 system can be designed to communicate pneumatic circuit failures through the ABS/EBS ECU 50 to the engine serial link (J1922/J1939) to instruct the engine to go into a "limp" mode. The intention of this feature is to provide a "nuisance" motivator to the operator to have the vehicle repaired. The system operates as follows: In the event of a failure of a pneumatic system which is supplied by either the primary reservoir 18 or the secondary reservoir 12 the air dryer reservoir module's 10 integral pressure sensors 37 communicates the system pressure status to the ABS/EBS ECU 50. The ECU 50 instructs the engine control module (ECM) 52 to limit vehicle speed if the vehicle is in excessive of a set limit.

Referring now to FIG. 4 there is shown the secondary reservoir 12 with an integral purge volume 34. A baffle 53 separates the purge volume 34 from the secondary reservoir 12. An internal tube 54 extends through the purge volume 34 to connect the reservoir 12 through connections within housing 16 to the air dryer 14. A connection 55 connects the purge volume 34 through connections within housing 16 to the air dryer 14. This construction eliminates external lines for connecting the air dryer 14 to the purge volume 34 and the secondary reservoir 12. External lines have the potential for leak points, and create customer handling and mounting concerns. Building the purge volume 34 required for the air dryer into the secondary reservoir 12 allows the use of a compact system purge air dryer desiccant cartridge and this minimizes the space required. Baffle 53 has tube 54 attached through it and the tube 54 extends through the purge volume 34 and terminates at the head of the reservoir. The head of the reservoir has attached to it the housing 16 which is integral with air dryer 14. The air dryer communicates with both volumes 12 and 34 via separate passages 54 and 55.

With a leaking reservoir 12 or 18 the dryer reservoir module 10 described above will recharge the surviving reservoir indefinitely, thereby holding off the spring brakes. The driver can choose to operate the vehicle with limited braking efficiency for an unlimited period of time even though one of the reservoirs does not hold pressure. In another embodiment the dryer reservoir module 10 can be constructed to equalize the pressure between the reservoirs 12 and 18, such that if the vehicle is parked for a given period of time the pressure cannot be replenished thereby limiting the use of the vehicle with a severely leaking reservoir.

As shown in FIG. 6 and described above, pressure protection valves 35 and 36 are used to supply compressed air to the primary reservoir 18 and the secondary reservoir 12. The pressure protection valves 35, 36 are set to pressurize the primary reservoir 18 first, provided the same pressure exists within the primary and secondary reservoirs. At full system pressure the pressure protection valves 35, 36 are open, insuring equal pressure in both the primary and secondary reservoirs 18 and 12. However, the pressure protection valve opening pressure is dependent upon the downstream reservoir pressure, therefore, if the reservoir pressures are not equal the pressure protection valve which has the highest downstream pressure will open first. Parking the vehicle overnight or for extended periods of time may cause the primary and secondary reservoir pressures to become unequal. During recharging of the air system the secondary reservoir 12 may charge before the primary reservoir 18. It may be desirable to limit the duration the vehicle can be operated in the condition where one reservoir has significantly reduced pressure. By using a pressure equalizing mechanism, such as a connecting line with a suitable orifice 57, the pressures in the reservoirs 12 and 18 slowly become equal so that during recharging of the air system the primary reservoir 18 will charge first. Furthermore, if the primary reservoir 18 has become ruptured or has a severe leak the pressure in both reservoirs 12 and 18 will migrate to 0 psi; thereby preventing recharging of the secondary reservoir 12 since the primary reservoir 18 will not recharge due to the leak. If the secondary reservoir 12 is ruptured or has a severe leak, again the pressure in both reservoirs 12 and 18 will migrate to 0 psi; however, the primary reservoir 18 can be recharged, but the essential accessories and air suspension will not be pressurized because the secondary reservoir 12 cannot be recharged. The pressure equalizing mechanism 57 will cause the pressure in both reservoirs 12 and 18 to be equal, thereby charging the primary reservoir 18 first and limiting the use of the vehicle after a severe leak in either the primary or secondary reservoirs 18 and 12.

What is claimed is:

1. An air supply system for a heavy motor vehicle brake system comprising:
    a compressor for supplying compressed air;
    an air dryer connected to receive compressed air from said air compressor including a desiccant bed through which the compressed air can flow to provide a clean and dry compressed air source for operating the brake system;
    a secondary reservoir;
    a housing connecting said air dryer and said secondary reservoir together as a unitary module;
    a primary reservoir located away from said secondary reservoir;
    control components disposed in said housing for controlling air flow from said air compressor through said air dryer for charging said primary reservoir and said secondary reservoir with compressed air;
    a purge volume formed integral with said secondary reservoir; and,
    said control components also control air flow from said purge volume through said air dryer desiccant bed to atmosphere to purge said air dryer.

2. An air supply system as claimed in claim 1 comprising:
    a pressure equalizing mechanism disposed between said secondary reservoir and said primary reservoir for equalizing the pressure in said secondary reservoir and said primary reservoir.

3. An air supply system as claimed in claim 1 comprising:
    a primary pneumatic protection control valve disposed within said housing for controlling pneumatic pressure fed to said primary reservoir; and,
    a secondary pneumatic protection control valve disposed within said housing for controlling the pneumatic pressure fed to said secondary reservoir.

4. A compressed air system for a heavy motor vehicle comprising:
    an air compressor providing a source of compressed air;
    a housing having an inlet connected to receive compressed air from said air compressor;
    an air dryer securely fastened to housing;
    a secondary compressed air reservoir securely fastened to said housing forming with said housing and said air dryer a module;
    a primary compressed air reservoir having a pneumatic connection to said housing disposed remote from said module;
    said module including control components and connections for controlling compressed air flow between said air dryer and said secondary compressed air reservoir and said primary compressed air reservoir; and,
    a pressure equalizing mechanism disposed between said secondary reservoir and said primary reservoir for equalizing the pressure in said secondary reservoir and said primary reservoir.

5. A compressed air system as claimed in claim 4 comprising:
    a purge volume formed integral with said secondary reservoir; and, said control components also control air flow from said purge volume through said air dryer desiccant bed to atmosphere to purge said air dryer.

6. An air dryer assembly for providing compressed air from an air compressor on a heavy motor vehicle comprising:
    an air dryer connected to receive compressed air from said air compressor;
    a first air reservoir separate from said air dryer;
    a housing containing pneumatic circuit components for controlling the flow of compressed air from said air compressor through said air dryer to said first reservoir having said air dryer and said first reservoir securely attached thereto for securing said air dryer and said first reservoir together as a module;
    a second air reservoir having a pneumatic connection to said housing disposed remote from said first air reservoir;
    a first pressure protection valve disposed within said housing for controlling charging of said first reservoir;
    a second pressure protection valve disposed within said housing for controlling charging of said second reservoir; and,
    a pressure mechanism disposed between said first reservoir and said second reservoir for equalizing the pressure in said first reservoir and said second reservoir.

7. A compressed air system for a heavy vehicle pneumatic braking system comprising:
    an air compressor for supplying compressed air when loaded and for not supplying compressed air when unloaded;
    a primary reservoir;
    a secondary reservoir located away from said primary reservoir;
    an air dryer connected to receive compressed air from said air compressor including a dessicant bed through which the compressed air can flow to provide a clean and dry compressed air source to said primary reservoir and said secondary reservoir for operating the brake system and being connected to said secondary reservoir to form an air dryer and reservoir module;

a check valve disposed between said air dryer and said primary and secondary reservoirs and being part of said air dryer and reservoir module;

a purge volume being part of said secondary reservoir for purging said desiccant bed when said air compressor is unloaded; and a pressure equalizing mechanism disposed between said secondary reservoir and said primary reservoir for equalizing the pressure in said secondary reservoir and said primary reservoir.

8. A compressed air system for a heavy vehicle pneumatic braking system as claimed in claim 7 system comprising:

a primary pressure relief valve being part of said air dryer and reservoir module, being disposed between the outlet of said check valve and said primary reservoir, and being set to open when the applied pressure exceeds a first pressure and to close when the applied pressure falls below a second lower pressure.

9. A compressed air system for a heavy vehicle pneumatic braking system as claimed in claim 8 system comprising:

a secondary pressure relief valve being part of said air dryer and reservoir module, being disposed between the outlet of said check valve and said secondary reservoir, and being set to open when the applied pressure exceeds a first pressure and to close when the applied pressure falls below a second lower pressure.

* * * * *